2,739,953
ORGANIC HALOGEN COMPOUND—CONTAINING COATING COMPOSITION

Edmund Rogers, South Euclid, Ohio, assignor to The Engine Parts Manufacturing Company, Cleveland, Ohio, a corporation of Ohio No Drawing. Application October 13, 1951,
Serial No. 251,254

2 Claims. (Cl. 260—33.6)

This invention relates, as indicated, to improved coating compositions which are particularly adaptable for spraying from pressurized containers. More particularly, this invention relates to coating compositions of the lacquer type, which compositions are free from certain difficulties encountered when it is attempted to spray pigmented lacquers of the type hereinafter more particularly described.

The application of paints and lacquers by spray techniques is not new, various methods having been developed whereby a liquid body of the coating composition may be means of pressure expanding through a small orifice become finely divided into particles of substantially the same composition as the liquid body and propelled to the surface to be coated. Ordinarily, compressed air has been used as the pressure creating and propelling medium. Inert gases such as carbon dioxide, nitrogen, and the like have been used in place of the air. In other instances the spray producing pressure has been generated continuously during the spraying operation by mechanical means.

Lacquers, which contain as the principal firm-forming ingredient certain solvent type polymers ordinarily used in the manufacture of commercially available lacquers, when sprayed under the conditions which have been found to be particularly suitable and hereinafter more particularly described, exhibit a tendency to "alligator," "orange peel," or produce a dried film having a hammered metal appearance. This is not undesirable in many cases, but there are occasions where it is necessary to produce smooth appearing lacquered surfaces by the aerosol technique in which the dried films are substantially free of the previously mentioned characteristics. Examples of this include lacquering of small metal or wood objects, and "touch-up" work on larger objects.

It is, therefore, a principal object of this invention to provide a lacquer type coating composition which when sprayed by the aerosol technique utilizing the propellants hereinafter described will yield a dried film free from alligatoring or hammered metal effects.

Other objects of this invention will appear as the description proceeds.

To the accomplishment of the foregoing and related ends, said invention, then, consists of the means hereinafter fully described and particularly pointed out in the appended claims, the following description setting forth in detail certain embodiments of the invention, such disclosed means constituting, however, but a few of the various forms in which the principle of this invention may be employed.

It has been found that the addition of a halogen containing organic compound to a lacquer composition comprising polyalkyl acrylate lacquer base in a suitable solvent and approximately an equal amount by volume of fluoro-chloromethane, with or without a pigment produces a composition admirably adapted to the accomplishment of the foregoing objects.

In its broadest aspects, therefore, this invention may be defined as comprising a lacquer composition containing as the lacquer base, or resinous film-forming ingredient, a poly-alkyl acrylate in a suitable solvent therefor, approximately an equal volume of a propellant material, such as normally gaseous fluoro-chloromethane, and from about 2% to about 10% by volume of a halogen-containing hydrocarbon, said material containing from 1 to 8 carbon atoms, and having a boiling point of from about 30° C. up to about 190° C., and preferably from about 75° C. to about 180° C. More particularly, this invention comprises a pigmented lacquer composition containing a polymethyl methacrylate base in a solvent system consisting essentially of xylene, or other suitable low boiling monocyclic, aromatic hydrocarbon such as benzene or toluene, or mixtures thereof with a low molecular weight alcohol such as methyl or ethyl alcohol; difluoro-dichloromethane in an amount substantially equal by volume to the lacquer base plus solvent plus pigment, if any, and from 2% to 10% by volume of carbon tetrachloride.

The fluoro-chloromethanes, which are an essential ingredient of the compositions of this invention, are non-flammable gases at ordinary pressures, and accordingly, the compositions of this invention exist only at super-atmospheric pressures thus rendering these compositions admirably suited to spray application. Of the three possible fluoro-chloromethanes, difluoro-dichloromethane, trifluoro-chloromethane, and mixtures thereof are most suited for use in accordance with this invention. The monofluoro-trichloromethane is of too high boiling point for use alone where spray application is desired, and too low boiling point for use at atmospheric pressure. It may, however, be used as a diluent to regulate the container pressure in conjunction with either or both of the other members of this class in the compositions of this invention. Thus, the fluoro-chloromethane which is essentially present in these compositions comprises in substantial part at least one of the fluoro-chloromethanes which is normally gaseous and which has the formula

wherein R is selected from the group consisting of chlorine and fluorine.

The fluoro-chloromethane derivative of this invention serves not only as a propellant for the lacquer but, as indicated in the previously filed copending applications, Rogers, Ser. No. 144,865, filed February 17, 1950, and Stetz and Rogers, Ser. Nos. 146,405 and 146,406, filed February 25, 1950 (the present invention being an improvement thereon) when in combination with the poly-alkyl acrylate lacquer base and a bronzing pigment, also renders such compositions stable to the formation of irreversible gels and obviates the difficulties heretofore experienced with bronzing lacquers, namely, "greening" and "gelling" or "souring."

The second essential ingredient of this invention is a polyalkyl acrylate resin which serves in whole or in part as the lacquer resin. Specific examples of such resins include the polymethylacrylates, the polyethylacrylates, the polybutylacrylates and the methacrylate ester polymers, such as the methyl, ethyl, n-propyl, n-butyl, and isobutyl methacrylates. Of these, polymethylmethacrylate is preferred. These materials, which range from soft, sticky semi-liquids to tough, hard solids, are not useful as such in this invention, and are accordingly used in the presence of a suitable solvent system which may consist of a single solvent material, or a plurality of solvent materials. The acrylate resins are generally soluble in aromatic hydrocarbons, chlorinated hydrocarbons and esters. In certain instances, the viscosity of the solution may still be too high for practical usage, in which case the viscosity may be further decreased by dilution with an alcohol such as methyl or ethyl alcohol.

I prefer to use the aromatic hydrocarbons of relatively low boiling point, particularly the monocyclic aromatic hydrocarbons such as benzene, toluene, and xylene. It may be found desirable to further dilute such a solution with ethyl or methyl alcohol, although I have found it to be unnecessary particularly with the semi-liquid acrylate resins. In general, such lacquer solutions contain anywhere from 8% to 50% solids. Polymethyl methacrylate lacquers (clear) usually contain from about 20% to 30% solids.

The pigmentary materials which may be used in accordance with this invention are those which are ordinarily employed to impart color to lacquer bases, including the metallic pigments such as powdered aluminum and the copper-zinc alloys commonly employed to obtain gold or bronze colors. Such pigments may be incorporated by ordinary methods, e. g., ball mill, or the lacquer purchased with the pigment included.

Color may be imparted by dye or pigment. Such dyes include the spirit-soluble and oil-soluble types, and yield transparent effects with poor light stability. Phosphotungstic and phosphomolybdic acid lakes of the dyes are more resistant to fading, bronzing and bleeding.

The pigments which produce solid, opaque colors are essentially those also used for oleoresinous and alkyd enamels. These include carbon black, stibnite, zinc oxide, zinc sulphide, titanium dioxide. Where the vehicle solid percentage is low, it is necessary to use pigments of maximum hiding power. Other useful pigments include ultramarine, phthalocyanine blues, chrome greens, chrome yellows and oranges, toluidine red, etc.

As has been indicated above, the principal improving agent of this invention is an organic halogen containing compound, preferably one of relatively low molecular weight containing from 1 to 8 carbon atoms and having a boiling point generally above the temperature at which the composition is applied, i. e., 30° C. up to about 190° C. The most satisfactory results have been obtained with halogen containing alkanes. The halogen is desirably chlorine, although bromine and fluorine, or mixtures of the same in the same molecule may be used. It should be pointed out, however, that the fluorine compounds of methane, for example, are too low boiling to be of value for the purposes of this invention, and for best results, compounds which have boiling points ranging from about 75° C. to about 180° C. are to be preferred.

Specific examples of halogen compounds which have been found suitable for use in accordance with my invention include chloroform, carbon tetrachloride, trichloroethylene, tetrachlorethylene, monochlorbenzene, dichlorbenzenes, difluorbenzene, 1,1-dibromo ethane, 1,2-dichloroethane, 1-bromopropane, 2-bromopropane, 1,1-dichloropropane, 1,2-dichloropropane, 1,1-dichloropropene-1, 2-bromo-2-methyl propane, 2-bromo-butane, 1-fluoro-2-methyl propane, 1-bromo-2, 2-dimethyl propane, 2-chloro-2-methyl butane, 2-chlorohexane, 1-chloro octane, cyclohexyl chloride, and the like.

These ingredients are believed to have a dual function in the compositions of this invention. First and foremost, the inclusion of the members of the above mentioned class, with the exception of those which for obvious reasons are too reactive with the remaining components of the compositions of this invention, e. g., benzyl-chloride, yields a sprayable lacquer composition which is free from the frequently undesirable characteristics of "alligatoring" and hammered metal finish. Secondly, these additives are also useful as depressants of the vapor pressure of the propellant since legal limits have been set on the pressure which valved containers may have for sale to the public. It becomes convenient at this point to illustrate several compositions which have been improved in the manner aforesaid by the inclusion of from about 2% to about 10% by volume of a halogenated organic compound of the type described above. It is to be understood that these examples are for illustrative purposes only and are not intended to limit the scope of the invention to the precise examples or quantities of ingredients shown therein.

*Example I*

| | | |
|---|---|---|
| Polymethylmethacrylate lacquer (22% solids) | gal | 1 |
| Pigmentary material | lb | 1 |
| Difluoro-dichloromethane | gal | 0.5 |
| Trichloro-fluoromethane | gal | 0.5 |
| Carbontetrachloride | gal | .1 |

*Example II*

| | | |
|---|---|---|
| Polymethylacrylate lacquer (20% solids) | gal | 0.75 |
| Pigmentary material | lb | 0.75 |
| Difluoro-dichloromethane | gal | 0.4 |
| Trichloro-fluoromethane | gal | .6 |
| Trichloroethylene | gal | 0.1 |

*Example III*

| | | |
|---|---|---|
| Polyethylmethacrylate lacquer (24% solids) | gal | 1 |
| Pigmentary material | lb | .5 |
| Difluoro-dichloromethane | gal | .5 |
| Trichloro-fluoromethane | gal | .5 |
| Monochlorbenzene | gal | .075 |

*Example IV*

| | | |
|---|---|---|
| Polybutylacrylate lacquer (27%) solids | gal | 1.5 |
| Pigmentary material | lb | 1 |
| Difluorochloromethane | gal | .6 |
| Trichloro-fluoromethane | gal | .5 |
| Chloroform | gal | .2 |

*Example V*

| | | |
|---|---|---|
| Polymethylmethacrylate lacquer (22% solids) | gal | 1 |
| Pigmentary material | lbs | 1.5 |
| Difluoro-dichloromethane | gal | 1 |
| Carbontetrachloride | gal | .2 |

*Example VI*

| | | |
|---|---|---|
| Polymethylmethacrylate lacquer (20% solids) | gal | 1 |
| Pigmentary material | lb | .2 |
| Difluorodichloromethane | gal | .5 |
| Trichloro-fluoromethane | gal | .5 |
| Carbontetrachloride | gal | 0.4 |

*Example VII*

| | | |
|---|---|---|
| Polymethylmethacrylate lacquer (20% solids) | gal | 1 |
| Pigmentary material | lbs | 2 |
| Difluoro-dichloromethane | gal | .5 |
| Trichloro-fluoromethane | gal | .5 |
| 1,2-dichloroethane | gal | .08 |

*Example VIII*

| | | |
|---|---|---|
| Polymethylmethacrylate lacquer (20% solids) | gal | 1 |
| Pigmentary material | lbs | 2 |
| Difluoro-dichloromethane | gal | .5 |
| Trichloro-fluoromethane | gal | .5 |
| 1,1-dichloropropene 1 | gal | 0.2 |

*Example IX*

| | | |
|---|---|---|
| Polymethylmethacrylate lacquer (22% solid) | gal | 1 |
| Pigmentary material | lb | 1 |
| Difluoro-dichloromethane | gal | 1 |
| Cyclohexylchloride | gal | 0.1 |

*Example X*

| | | |
|---|---|---|
| Polymethylmethacrylate lacquer (22% solid) | gal | 1 |
| Pigmentary material | lb | 1.5 |
| Difluoro-dichloromethane | gal | 0.5 |
| Trifluoro-chloromethane | gal | .5 |
| 1,1-dibromoethane | gal | 0.2 |

The resins indicated above may be purchased, for the most part, in the form of clear lacquers containing from 8% to 50% or more solids. While it is generally unnecessary to further alter the commercial lacquers prior to use in the compositions of this invention, where the clear lacquer is too viscous, it may be found desirable to further dilute with methyl or ethyl alcohol. Ordinarily, however, the solvent power of the fluorochloromethane component will adjust the viscosity to that which is proper for spray application.

The fluoro-chloromethanes mentioned in the previous examples are commercially available under the trade names Freon 12 ($CCl_2F_2$) and Freon 11 ($CCl_3F$). A 50–50 mixture of these two Freons yields pressures at ordinary temperatures ranging from about 27 to 30 p. s. i.; a 60–40 mixture of Freon 11 and Freon 12 respectively gives pressure of about 40 p. s. i. I prefer to compound the volatile ingredients of this invention to yield a pressure of less than about 40 lbs., and preferably from 27 to 30 p. s. i. While I prefer to use the fluorochloromethanes in substantially equal amount by volume with the lacquer, amounts ranging from 35% to 75% of the final volume may be used.

Having thus described my invention, what I claim is:

1. A pigmented lacquer composition maintained in a confined space under superatmospheric pressure and containing a polymethylmethacrylate base in a solvent system consisting essentially of xylene at a solids content of about 20%; an approximately 50–50 mixture of difluorodichloromethane and trichloro-fluoromethane in an amount substantially equal by volume to the lacquer base plus solvent plus pigment; and from 2% to 10% by volume of carbon tetrachloride.

2. A pigmented lacquer composition maintained in a confined space under superatmospheric pressure and comprising in combination 1 gal. of polymethylmethacrylate lacquer at a concentration of 22% solids in xylene; about 1 lb. of pigmentary material, about 0.5 gal. of difluorodichloromethane, about 0.5 gal. of trichloro-fluoromethane and from .1 to .4 gal. of carbon tetrachloride.

References Cited in the file of this patent

UNITED STATES PATENTS

| | | |
|---|---|---|
| 1,945,998 | Rotheim | Feb. 6, 1934 |
| 2,321,023 | Goodhue et al. | June 8, 1943 |
| 2,366,850 | Gardner | Jan. 9, 1945 |
| 2,515,250 | McIntire | July 18, 1950 |
| 2,617,780 | Lutz | Nov. 11, 1952 |

FOREIGN PATENTS

| | | |
|---|---|---|
| 811,418 | France | Jan. 14, 1937 |

OTHER REFERENCES

Bennett Concise Chemical and Technical Dictionary, published 1947, Chemical Publishing Company, Brooklyn, New York, page 414.